3,655,834
LOWERING THE MOLECULAR WEIGHT OF HIGH
MOLECULAR WEIGHT POLYETHYLENE IN THE
POWDER PHASE
Karl Wisseroth, Ludwigshafen, and Richard Scholl,
Nordring, Germany, assignors to Badische Anilin- &
Soda-Fabrik Aktiengesellschaft, Ludwigshafen (Rhine),
Germany
Filed Nov. 13, 1969, Ser. No. 876,332
Int. Cl. C08f *3/06, 27/22, 27/26*
U.S. Cl. 260—94.9 GC                5 Claims

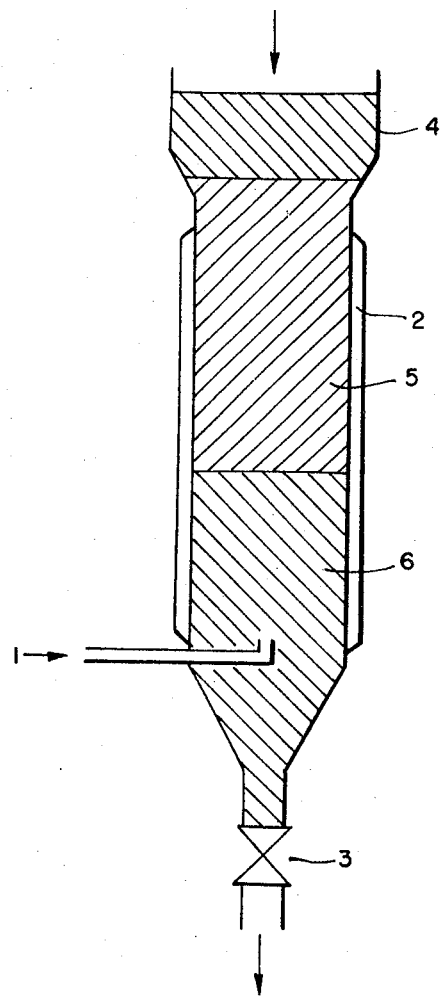

ABSTRACT OF THE DISCLOSURE

Lowering the molecular weight of high molecular weight polyethylene by swelling particles of polyethylene with an organic solvent and heating the particles in an oxygen atmosphere at elevated temperature. Polyethylene thus obtained is more easily processed in extruders.

---

The invention relates to a process for lowering the molecular weight of high molecular weight polyethylenes by thermal oxidative degradation in the powder phase.

In the low pressure polymerization of ethylene, high catalyst productivities are as a rule obtained only for the higher mean molecular weights of the polymers whose intrinsic viscosities may lie for example between 3.5 and 5 dl./g.

Polyethylene having so high a melt viscosity is however very difficult to process by conventional methods; for conventional processing equipment, for example extruders, a material having a melt viscosity of about 1.5 to 2.5 is most suitable.

Various methods have therefore been proposed for lowering the molecular weight and these have been adopted by industry. Thus for example it is possible by purely thermal degradation (cracking) in a melt at temperatures of from 300° to 400° C. to obtain the desired lower molecular weight products in a readily reproducible manner. Expensive equipment, for example a screw extruder, is however necessary for the purpose.

Another possibility is thermal oxidative degradation in solution phase such as is described in U.S. patent specification No. 3,110,708. Here again a substantial expenditure is required for equipment; moreover great loss of solvent always occurs.

A very simple method of thermal oxidative degradation in the powder phase has been proposed (U.S. patent specification No. 808,281) for polypropylene and polybutene-(1). It is not possible to degrade polyethylene by this method.

The invention has for an object to provide a simple method of lowering the molecular weight of polyethylene.

This and other objects and advantages are achieved in accordance with this invention in a process which comprises swelling polyethylene particles having a diameter of from 10 microns to 3 millimeters by contacting said particles with from 0.1 to 20% by weight, with reference to the polymer, of a solvent selected from the group consisting of xylene, decahydronaphthalene, tetrahydronaphthalene, octane, nonane, decane, naphtha having a boiling range of from 150° to 180° C. and partially chlorinated hydrocarbons having a boiling range of from 120° to 220° C. and treating said swollen particles with oxygen at a temperature of from 110° to 135° C.

The desired intrinsic viscosity may be obtained by varying the temperature and duration of the degradation process so that a polyethylene is obtained which can be processed easily.

The process has the further advantage that the degraded polyethylene obtained has a very uniform molecular weight distribution so that, after having been processed, excellent shaped articles are obtained which do not change in shape during annealing.

The process is suitable for degrading high molecular weight linear polyethylene having a density of more than 0.94 g./cm.$^3$; the particle size of the particulate polyethylene may be from 10 microns to 2 millimeters.

The amount of solvent used for swelling the polyethylene in the degradation process is from 0.1 to 20% by weight with reference to polyethylene. If more than 20% is used there is a risk that the moist powder may agglomerate; when less than 0.1% is used, no degradation occurs. A preferred embodiment consists in degrading polyethylene which has been swollen with from 1 to 10% of its weight of solvent. Swelling may be carried out before or simultaneously with the degradation reaction. The polyethylene powder may be impregnated with solvent, it may be immersed in solvent and the solvent decanted off, or the solvent may be sprayed into a layer of the powder.

The bulk volume of the polyethylene increases by about 30% as a result of the swelling process. This increase in volume is evidently necessary for the oxygen to be able to attack in the degradation reaction.

Instead of pure oxygen it is advantageous to use air. Modified oxygen concentrations may be used however, for example by adding pure oxygen to air or by adding inert gases such as nitrogen, carbon dioxide and particularly steam. The latter may serve at the same time as a heat carrier for the reaction or for preventing static electrification which may otherwise occur in a mechanically moved layer.

If the air is used in the form of an air current, the solvent is removed again from the polyethylene powder. In this way the degraded polymer is again obtained in a condition devoid of solvent.

The degradation reaction (i.e. the action of oxygen) is carried out at temperatures of from 110° to 135° C. Above 135° C. the polyethylene discolors and sinters, below 110° C. the degradation process is too slow. It is advantageous to use temperatures of from 120° to 130° C.

The action of the oxygen has to last for at least five minutes for the polyethylene to be degraded to an appreciable extent; in practice residence times of from fifteen minutes to some hours are used.

Organic liquids whose boiling points are from 120° to 220° C. are suitable as solvents. Solvents which boil at above 220° C. can only be removed from the polymer with great difficulty by a current of air. Examples of suitable solvents are xylene, decahydronaphthalene, tetrahydronaphthalene, octane, nonane, and decane. In commercial operations it is advantageous to use naphtha having a boiling range of from 150° to 180° C. Partly chlorinated hydrocarbons are also important from the point of view of safety.

The process may be carried out in batches; a continuous process in a reaction tube such as is illustrated diagrammatically in the drawing is however of greater importance industrially.

High molecular weight polyethylene is fed continuously into the top of the reaction tube and the degraded product is withdrawn at the bottom 3. The temperature of the degradation reaction can be controlled by a heating jacket 2 which surrounds the tube.

At the beginning of the degradation reaction, the tube is filled in its lower third with powdered high molecular weight polyethylene which has previously been impregnated with about 10% by weight of solvent. Dry powder is placed on top of this moist powder. A stream of air through line 1 is adjusted so that the solvent is carried upwardly by the air stream at the same rate as the product moves downwardly by discharge through the discharge valve 3.

Under steady-state conditions, there is formed a layer of swollen powder from which dry powder is always descending but in which the solvent does not alter its position relatively to the reaction tube.

The process of lowering the molecular weight of high molecular weight polyethylenes in the powder phase in accordance with this invention may naturally be carried out by techniques other than that described. Thus for example the degradation may be carried out in a mechanically agitated bed or in a fluidized bed.

The following examples illustrate the invention.

EXAMPLE 1

To demonstrate the dependence on time of the thermal oxidative degradation of polyethylene in the powder phase, a batch experiment was carried out on a laboratory scale:

A U-tube was filled with about 20 g. of powdered high molecular weight polyethylene having a particle size of 50 to 500 microns and placed in an oil bath.

Before the tube was filled, about 5 g. of the polymer powder was impregnated with about 10% of decahydronaphthalene on the side where a very weak stream of air heated to the intended reaction temperature entered. Samples were taken after certain periods on the side where the air entered and the intrinsic viscosity was determined. Table 1 shows the results.

After the experiment was over, the solvent (which was originally present in a relative amount of 2.5% with reference to the whole of the polymer) had practically completely disappeared. The condition of the powder remained practically unchanged by the treatment. In a comparative experiment without any solvent, no degradation of the molecular weight took place.

TABLE 1

|  | Intrinsic viscosity in dl./g. after degradation at— | | |
| --- | --- | --- | --- |
|  | 125° C. | 125° C. | 127° C. |
| Duration in hours: | | | |
| 0 | 3.2 | 5.5 | 5.5 |
| 2 | 2.70 | 5.0 | 4.7 |
| 4 | 1.90 | 4.9 | 3.4 |
| 6 | | 3.75 | |
| 8 | 0.92 | 1.55 | 1.35 |

EXAMPLE 2

A reaction tube as shown in the drawing having a diameter of 15 cm. and a length of 3 meters has the lower third filled with 8 kg. of particulate high molecular weight polyethylene having a particle size of 100 to 800 microns which has previously been soaked with 1 liter of decahydronaphthalene (about 10% of its weight). Dry powder is placed on top. About 10 liters per hour of air preheated to 125° to 170° C. is fed in through the lower air inlet 1 while a temperature of from 125° to 128° C. is maintained in the polyethylene powder through the entire height of the filling by means of a steam heated jacket 2. After a running-in period of about one hour, an hourly amount of about 4 to 5 kg. of degradation product is withdrawn at the lower end through a discharge valve 3, while at the same time an equal weight of high molecular weight polyethylene powder is fed into the top of the tube through a feed hopper 4.

After a few hours running time, steady-state conditions are set up by the formation in the central portion of the reaction tube of a layer 5 of swollen powder. Given a high molecular weight dry polyethylene powder 4 having an intrinsic viscosity of from 4 to 4.5 dl./g., a degradation product 6 results having an intrinsic viscosity of about 2 dl./g.

The product obtained looks much like the original high molecular weight powder. It is practically devoid of solvent and almost odorless. It may be used in this form for conventional processing methods as for example injection molding, extrusion, blow molding or the production of film and sheeting.

We claim:

1. A process for lowering the molecular weight of high molecular weight polyethylene having a density of more than 0.94 g./cm.$^3$ which comprises swelling polyethylene particles having a diameter of from 10 microns to 2 millimeters by contacting said particles with from 0.1 to 20% by weight, with reference to the polymer, of a solvent selected from the group consisting of xylene, decahydronaphthalene, tetrahydronaphthalene, octane, nonane, decane, naphtha having a boiling range of from 150° to 180° C. and partially chlorinated hydrocarbons having a boiling range of from 120° to 220° C. and treating said swollen particles in the presence of said solvent with oxygen at a temperature of from 110° to 135° C. for from about 5 minutes to 8 hours while said swelling being sufficient to permit oxygen to react with the polyethylene.

2. A process as in claim 1 wherein the particulate polyethylene is swollen with from 1 to 10% of its weight of solvent.

3. A process as in claim 1 carried out at a temperature of from 120° to 130° C.

4. A process as in claim 1 carried out for a period of at least fifteen minutes.

5. A process as in claim 2 carried out continuously in a heated vertical tube provided with an ascending flow of heated air, the tube having dry polyethylene particles fed into the top and degraded particles withdrawn at the bottom while the central portion of particles is swollen with said solvent.

References Cited

UNITED STATES PATENTS

| 3,110,708 | 11/1963 | Wisseroth et al. | 260—93.7 |
| 3,155,644 | 11/1964 | Kehr | 260—94.9 |

FOREIGN PATENTS

| 681,180 | 3/1964 | Canada | 260—94.9 |
| 686,192 | 5/1964 | Canada | 260—94.9 |

JOSEPH L. SCHOFER, Primary Examiner

W. F. HAMROCK, Assistant Examiner

U.S. Cl. X.R.

260—96